M. E. PETERS, G. H. FATH & A. F. MILLER.
COMBINED SECOND AND THIRD STAGE TURN IN AND FINISHING TREATMENT FOR BOX WRAPPING MACHINES.
APPLICATION FILED SEPT. 25, 1916.
1,251,816.
Patented Jan. 1, 1918.
5 SHEETS—SHEET 1.
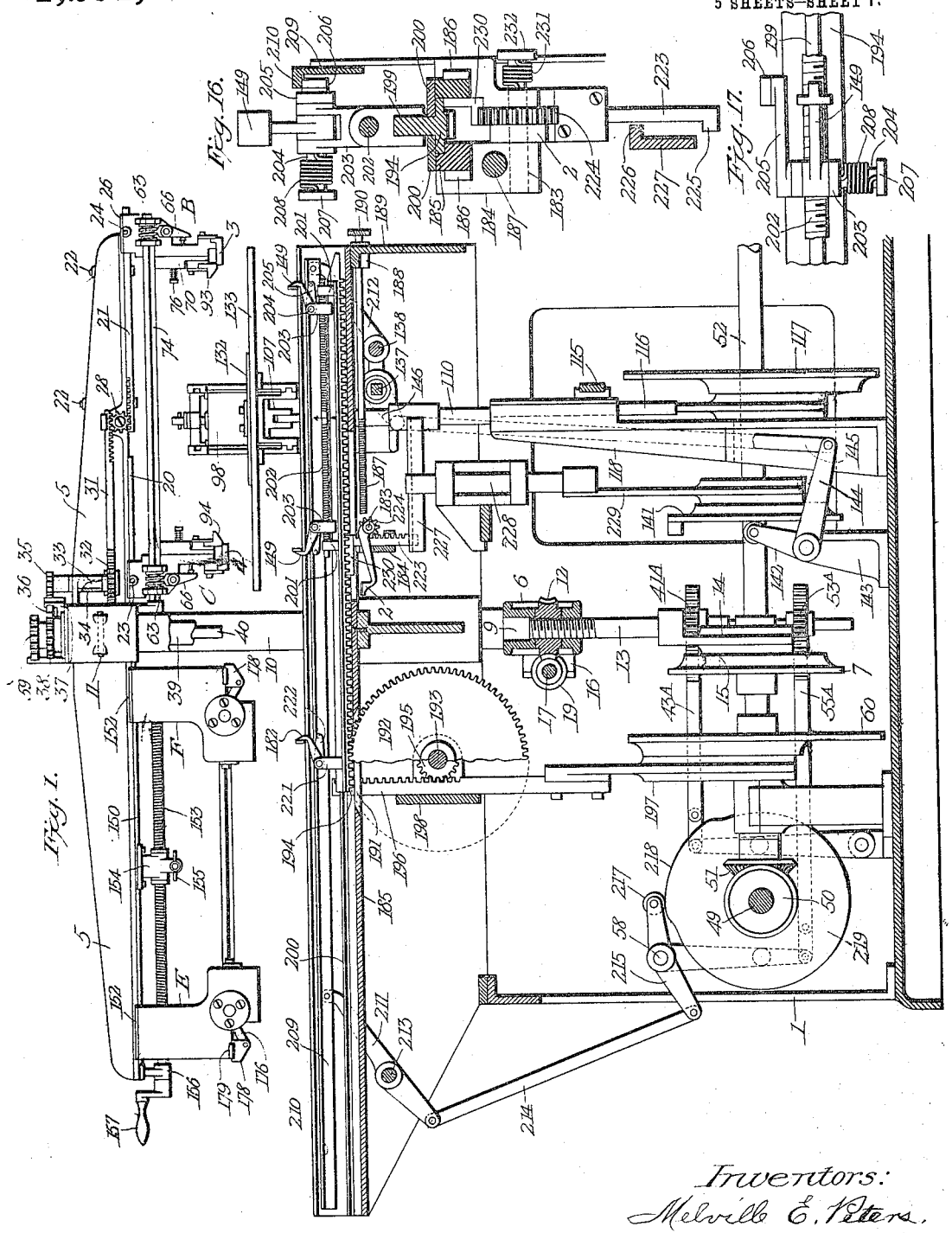
Witnesses:
G. Sargent Elliott
Adella M. Fowle
Inventors:
Melville E. Peters
George H. Fath
Albert F. Miller
By H. S. Bailey, Attorney.

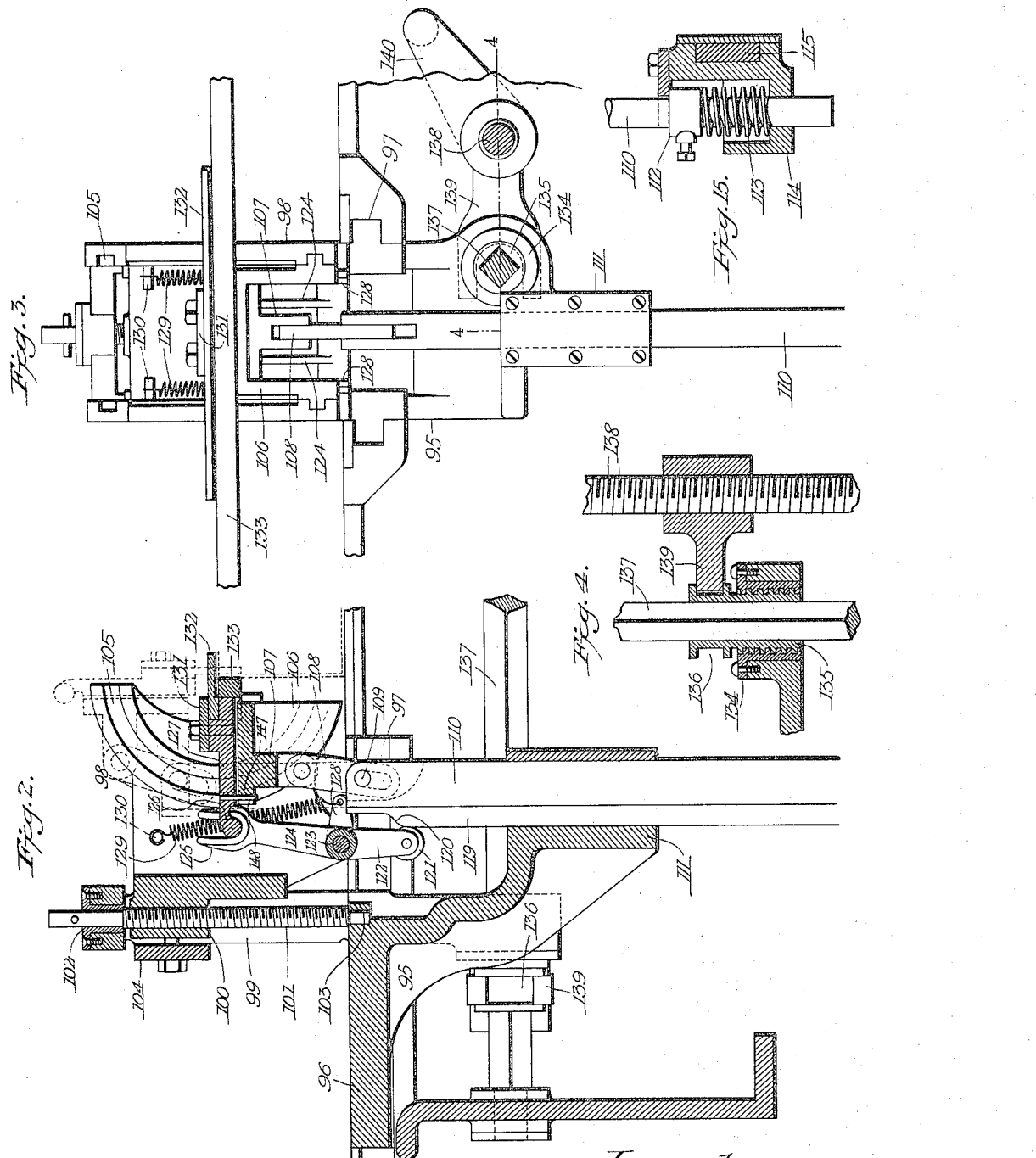

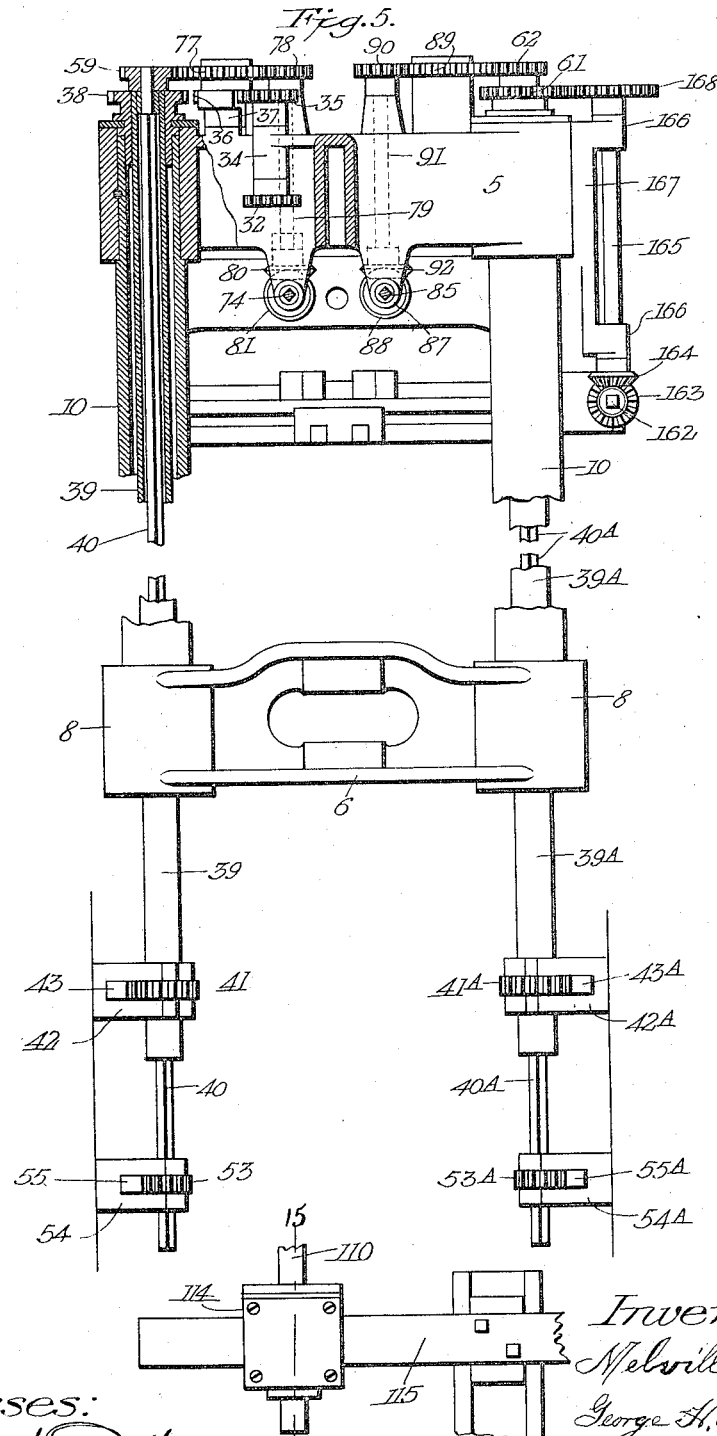

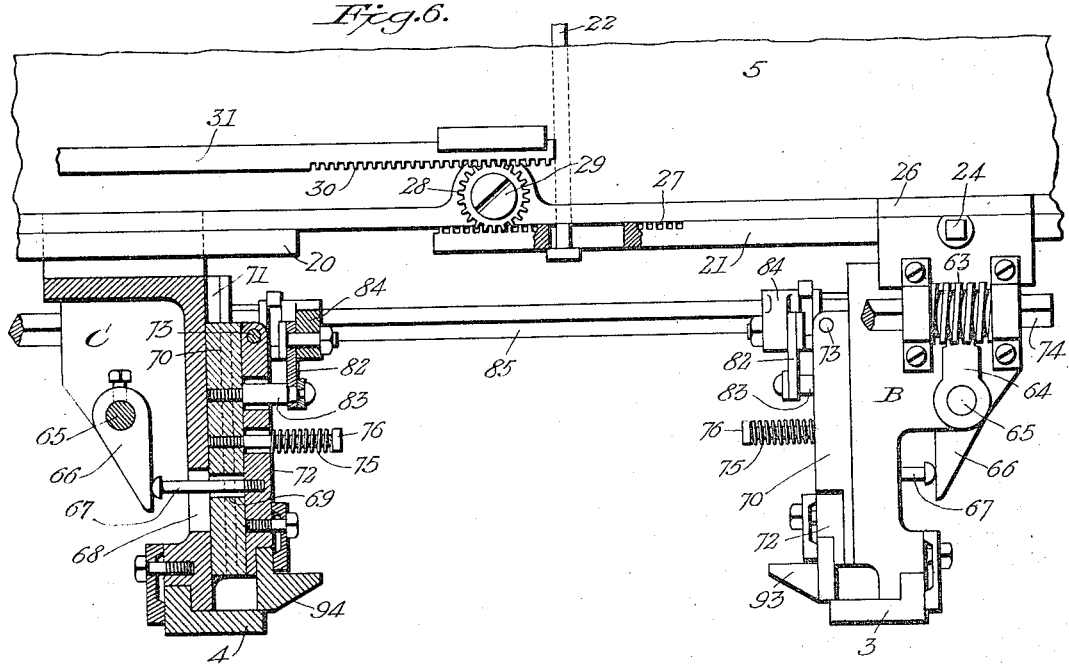
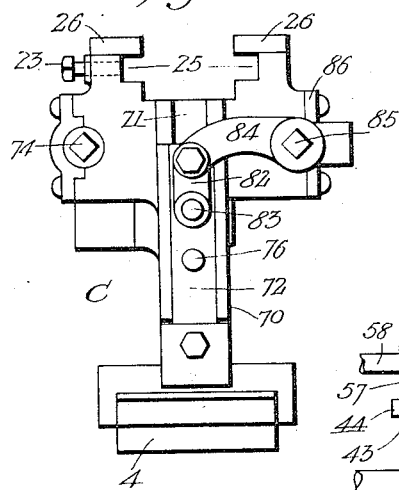
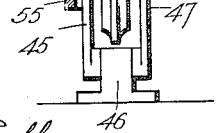

M. E. PETERS, G. H. FATH & A. F. MILLER.
COMBINED SECOND AND THIRD STAGE TURN IN AND FINISHING TREATMENT FOR BOX WRAPPING MACHINES.
APPLICATION FILED SEPT. 25, 1916.
1,251,816.
Patented Jan. 1, 1918.
5 SHEETS—SHEET 5.
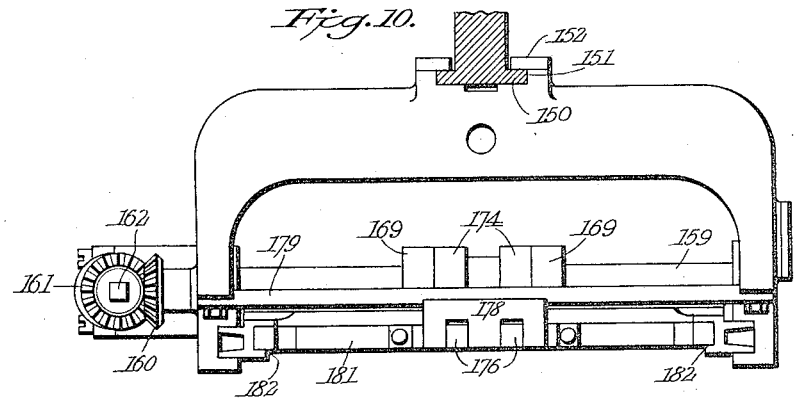
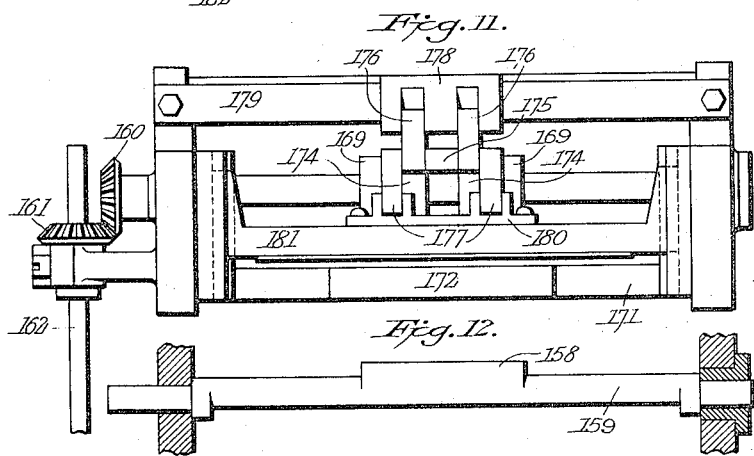
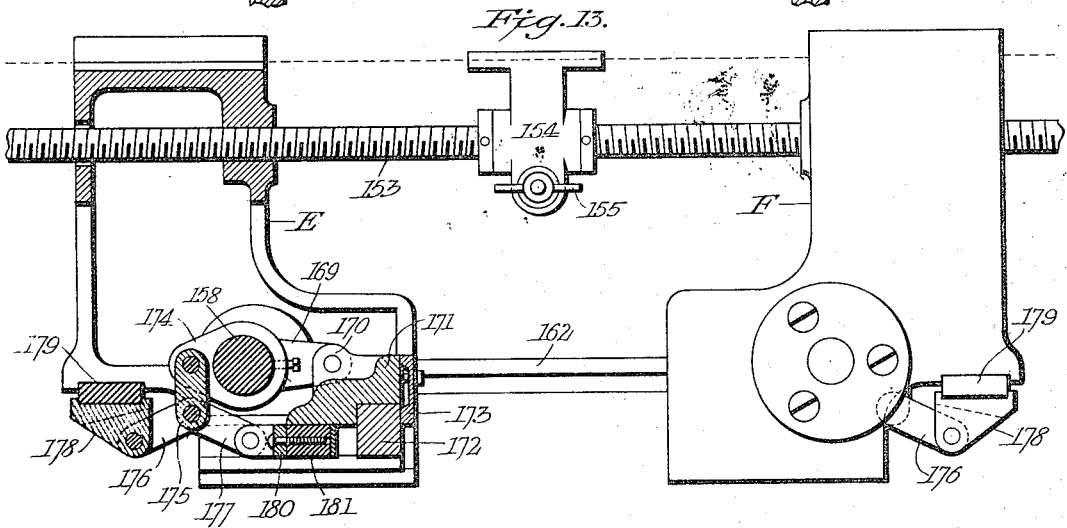
Witnesses:
G. Sargent Elliott
Adella M. Fowle
Inventors:
Melville E. Peters,
George H. Fath,
Albert F. Miller,
By H. S. Bailey, Attorney.

UNITED STATES PATENT OFFICE.

MELVILLE E. PETERS, GEORGE H. FATH, AND ALBERT F. MILLER, OF DENVER, COLORADO, ASSIGNORS TO THE PETERS PATENT RIGHTS COMPANY, OF DENVER, COLORADO, A CORPORATION OF COLORADO.

COMBINED SECOND AND THIRD STAGE TURN-IN AND FINISHING TREATMENT FOR BOX-WRAPPING MACHINES.

1,251,816.  Specification of Letters Patent.  Patented Jan. 1, 1918.

Original application filed November 5, 1915, Serial No. 59,860. Divided and this application filed September 25, 1916. Serial No. 122,059.

*To all whom it may concern:*

Be it known that we, MELVILLE E. PETERS, GEORGE H. FATH, and ALBERT F. MILLER, citizens of the United States of America, residing at the city and county of Denver and State of Colorado, have invented a new and useful Combined Second and Third Stage Turn-In and Finishing Treatment for Box-Wrapping Machines, of which the following is a specification.

Our invention relates to a combined box edge wrapping and box end edge finishing machine; and the objects of our invention are:

First, to give to partially wrapped boxes two successive and simultaneous treatments, the first of which completes the wrapping of the boxes, and the second gives a finishing treatment to the end and corners of the boxes, and Second, to provide a high speed box edge wrapping and box end finishing machine in which two boxes are under successive treatments at the same time, and that automatically feeds the boxes in successive intermittent order and that is adjustable to wrap and finish boxes of different sizes.

We attain these objects by the mechanism illustrated in the accompanying drawings, in which:

Figure 1 is a vertical longitudinal sectional view of a portion of a box wrapping machine showing its side and end-turn-in mechanisms constituting the second stage treatment and the pressing mechanism for the turned-in ends, which constitutes the third stage or finishing treatment; together with the mechanism for operating the various parts.

Fig. 2 is a vertical sectional view through one of the side-turn-in mechanisms and a portion of the supporting frame.

Fig. 3 is a front view of the same.

Fig. 4 is a horizontal sectional view on the line 4—4 of Fig. 3.

Fig. 5 is a front view of the overhead arm, its supporting standards, and parts carried by said arm.

Fig. 6 is a view of the end-turn-in mechanisms and a portion of the supporting arm, one of the said mechanisms being shown in vertical section and the other in side elevation.

Fig. 7 is a front view of one of the mechanisms shown in Fig. 6.

Fig. 8 is a plan view of a portion of the bed plate of the machine together with the mechanism carried thereby.

Fig. 9 is a sectional view on the line 9—9 of Fig. 8.

Fig. 10 is a front view of one of the end finishing mechanisms.

Fig. 11 is a bottom plan view of the same.

Fig. 12 is a view of the eccentric shaft which operates parts constituting the end finishing mechanism.

Fig. 13 is a view of the two end finishing mechanisms and the threaded rod for moving them toward and away from each other, one of the said mechanisms being shown in vertical section and the other in side elevation.

Fig. 14 is a front view of a portion of the cross bar for raising and lowering the bars which operate the side turn in mechanisms.

Fig. 15 is a sectional view on the line 15—15 of Fig. 14.

Fig. 16 is a transverse vertical sectional view, through the sideway of the table, showing the strap arm carriage, one of the box grippers, and coöperating parts. And Fig. 17 is a plan view of one of the grippers and portions of the rock bar, and of the threaded rod for adjusting the grippers.

Similar letters of reference refer to similar parts throughout the several views.

Our present invention aims to finish the wrapping of boxes by blanks that have been partially wrapped in another blank and box wrapping machine, with a view of increasing the production of completed boxes and also of producing wrapped boxes that are more tightly wrapped and that are wrapped with a more artistic finishing pressure than most boxes wrapped by the commonly used box wrapping machines.

Our present invention also aims to separate and individualize the edge and finishing treatments of boxes that are first wrapped in our multiple stage treatment box wrapping machine, for which we have a pending application in the U. S. Patent Office, which application was filed November 5th, 1915, and bears the Serial No. 59,860. Co-pending applications Serial Nos. 122,055, 122,056, 122,063 and 122,064 were also filed on Sept. 25, 1916, which show and claim parts of the mechanism herein described.

The boxes may be fed to our box edge wrapping and box end finishing machine by hand or by any suitable mechanism. We preferably, however, illustrate and use the following described box feeding mechanism for feeding the boxes to the wrapping mechanism and for discharging them from it after they are finished.

Referring to the drawings,—

The numeral 1 designates a box shaped frame that is provided with a top table portion and which we preferably term a table frame. This table frame is provided with a main driving shaft and with cam actuated lever and gear mechanism, and also with a box receiving and transfer mechanism, all of which will be presently described.

Assuming that the boxes are fed against a stop by any suitable box feeding or transferring mechanism or by hand, and that they have been partially wrapped in some other machine and left with their blanks partially wrapped around them, that is, with the blank adhesively wrapped to their bottoms, sides and ends, and that the top edges of the blank are projecting up above each box.

Then when a box so partially wrapped is fed against the stop arm 2 the first movement of the mechanism of our combined turn-in and finishing and box transmitting and discharging mechanism is to move the stop arm out of the progressive path of the box.

Then the forward end of the box is engaged by a push block 3 that is clamped on the lower end of a head block B. There are two of these head blocks B and C and they have a vertical reciprocal movement of sufficient stroke to raise above and to drop down behind the box, the head block B first pushing it forward against an abutment block 4 secured to the lower end of the opposite head block C, where it is gripped tightly between the members 3 and 4 of the blocks. The box is then first pressed down and is firmly seated against the top of the table portion of the frame by a downward vertical movement of the plates of the end turn in mechanism, which will be presently described.

The turning in of the ends of the blank into the ends of the boxes is accomplished by two different and independent operations of the end turn in mechanism and the side turn in mechanisms operate in between the two actions of the end mechanism, and we will first describe the first action of the end turn in mechanism. We will state, however, that at the time the box is being pushed forward against the abutment block 4 the first step treatment of turning in the ends of the blocks is performed automatically as follows:

The box end blank turning in mechanism comprises two vertically positioned head blocks B and C which are arranged to face each other.

The end turn in mechanism C is fixed relative to the frame of the machine, while the end turn in mechanism B has a short reciprocal horizontal movement by which it engages and moves the box against the abutment block 4 of the turn in mechanism C. After the box has been moved by the movable head block against the fixed head block, it is gripped and held rigidly until the edges of the projecting vertical edges of the blank are completely wrapped in the box. The two head blocks B and C are supported by and depend from an overhead arm 5 which is positioned above the table over its center and extends longitudinally along its entire length from adjacent to its first stage mechanism. This arm has a short vertical reciprocal movement that is imparted to it by a cross head 6 that is raised and lowered by a cam 7. This cross head comprises two cylindrical hub members 8 which are connected by a bar having a central opening 9. Within the hubs are secured the lower ends of two tubular vertical hollow standards 10, the upper ends of which are secured in hub portions of the overhead arm 5 by pins 11 which pass through the said hubs and through the standards. The opening in the bar of the cross head receives a worm gear 12 through which the threaded upper end of a circular bar 13 passes, the lower end of which is secured to a cam fork 14 having a roller 15 which enters a groove in the cam disk 7, and in this manner the cross head and the overhead arm are raised and lowered for a purpose to be hereinafter explained. Upon the hub portions of the cross head are bearings 16 in which is mounted a horizontal shaft 17 having a worm pinion 18 which meshes with the worm gear 12 carried by the cross head. The outer end of this shaft 17 carries a hand wheel 19, by turning which the worm pinion 18 is caused to turn the worm gear 12 in the cross head 6 whereby the threaded rod 13 may be lengthened or shortened to suit the depth of various sized boxes.

The overhead arm is provided with a fixed slideway bar 20 that is secured to its bottom in position to receive the head block C, and with a slideway bar 21 that has a short reciprocal movement, it being slidably mounted on bolts 22, which extend through the arm. The head block C is adjustably mounted on the slide bar 20 and it is secured thereon by a set screw 23 in a position to receive each different size box that the machine will wrap.

The head block B is also adjustably mounted on the movable slideway 21 and is secured thereon in adjusted positions by a set screw 24. Both head blocks are provided with guideways 25 that straddle their slideway bars, and are secured over the side edges of the slideways by cap strips 26 that are secured to their opposite sides. As illustrated these head blocks are positioned on their respective slideways in positions to receive between them the largest size box the machine will wrap. The reciprocating slideway bar 21 is provided with a number of gear teeth 27 which are engaged by a pinion 28 that is mounted on a stud screw 29 that is threaded into the side of the overhead arm 5. This pinion 28 also meshes with the teeth 30 of one end of a rack bar 31 that is mounted in a slideway that is formed in the overhead arm 5. The opposite end of this rack bar is also provided with gear teeth that mesh with a gear 32 that is mounted on the end of a short shaft 33 that is suitably journaled in a vertical bearing 34, on the overhead arm. The upper end of the shaft is also provided with a gear 35 that meshes with the teeth of one end of a rack bar 36 that is slidably mounted in a suitable bearing 37 secured upon the overhead arm. The opposite end of this rack bar is also provided with teeth that mesh with a gear 38 which is preferably brazed upon the top end of a square tubular shaft 39 that surrounds loosely a solid square shaft 40. The upper end of this square solid shaft is rounded and passes loosely through the gear 38, the solid shaft having a shoulder at the junction of its round and square portions, which bears against the gear 38. This square tubular shaft extends down through the frame and passes loosely through a gear 41 that is rotatably mounted in a suitable bearing 42 on the frame in which the gear is supported against vertical movement. A rack bar 43 is reciprocally mounted in the frame and its gear teeth mesh with the gear 41. The opposite end of this rack bar is pivotally connected to one end of a link 44, the opposite end of which is connected to one arm 45 of a double armed lever, which is pivotally mounted in a journal block 46, that is secured to the bed plate of the frame. The upper end of the other arm 47 of this double armed lever is provided with a roller which engages a groove in one side of a cam 48 that is mounted on the cross shaft 49. This cross shaft has secured upon it a bevel gear 50, which meshes with and is driven by a bevel gear 51 that is mounted on the end of the main driving shaft 52. The lower end of the solid shaft 40 passes loosely through a gear 53 which is mounted in a bearing 54 secured to the adjacent side of the frame. The gear 53 is in mesh with a rack bar 55, the opposite end of which is connected to a link 56, the other end of which connects with one end of a lever 57, which is loosely mounted on a stationary shaft 58. The intermediate portion of this lever carries a roller, which enters a groove in the opposite side of the cam 48.

The upper end of the solid square shaft 40 carries a gear wheel 59, the function of which will be hereinafter set forth. The rack bar 55 has a bend, as shown, so as to pass the circumferential edge of a cam 60. A cam 48 is secured upon the opposite end of the shaft 49, which operates a duplicate arrangement of the levers and rack bars just described, which rack bars operate a duplicate arrangement of the gears 41 and 53 and shafts 39 and 40. The upper ends of the right hand hollow shaft $39^A$ carry a gear wheel 61, and the upper end of the right hand solid shaft $40^A$ carries a gear wheel 62, the function of which will be hereinafter described.

Each head block is provided on its right hand side with a worm pinion 63 which is rotatably mounted in bearings formed on the side of each block. Each worm pinion of each head block meshes with a toothed segment 64, that is secured on one end of a pin 65, which is pivotally secured in the head block. A depending lever 66 is rigidly secured upon the pin, the lower end of which is arranged to engage a pin 67, which extends loosely through a long slot 68 formed in each block, and also through a slot 69 that is formed through a plate 70 that is reciprocally mounted in a slideway 71 that is formed in the outside edge of the head block, said pin being threaded into a finger blade or bar 72 which is seated in a slot formed in the outside surface of the plate 70. This finger blade is pivotally secured at its upper end by a pin 73 to the plate 70. The pin 67 is provided with a screw driver head to permit it to be adjusted to receive the stroke of the lever 66 due to the reverse rotary movement of the worm by its toothed segment, as will be hereinafter explained.

The worms are each provided with a square axial aperture in which a square shaft 74 fits loosely, and the head blocks and their worms are arranged in alinement on the overhead arm and the square shaft 74 extends across and through and beyond both worms. Consequently the worms of both head blocks are rotated in unison, and the levers 66 engage both pins 67 at the same time and swing the lower ends of the finger blades out from the plates at the same time. The finger blades are returned into their slots on the backward stroke of the levers 66 by expansive springs 75 which are mounted on pins 76 that extend loosely through apertures formed through the finger blades and are threaded into the plate 70.

The shaft 74 and the worms are rotated by a train of gearing in the following manner:

The pinion 59 on the upper end of the left hand solid shaft 40 meshes with one end of a rack bar 77, the opposite end of which meshes with a pinion 78 that is secured on the end of a shaft 79, the opposite end of which is provided with a bevel gear 80 that meshes with a bevel gear 81 on the adjacent end of the shaft 74. Thus the cam 48 through the lever arms 45 and 47 and left hand rack bar 43, imparts movement to the left hand solid shaft through its pinion 53, and the gear 59 on the upper end of this shaft operates the rack bar 77 which operates the gear, the lower end of whose shaft carries the gear 78 which operates the bevel gear 81 on the shaft 74, whereby the worms 63 are turned in unison, and the arms 66 thereby moved against the pins 67 to swing the plates 72 outward.

The plate 70 of each head block has a vertical reciprocal movement imparted to it, of about a half-inch stroke, which movement is effected in the following manner: A link 82 is pivotally secured at one end to each plate 70 by a pin 83 that extends loosely through an aperture in the finger blade and is threaded into the plate, and the opposite end of this link is pivotally connected at one end to a lever 84, the opposite end of which fits loosely on a square shaft 85, that is mounted in sleeve bearings rotatably journaled in bearings 86 that are formed on the head block.

The square shaft 85 is rounded at its rear end and extends through a bearing 87 on the transverse portion of the overhead arm 5, and a bevel gear 88 is secured to this end and the shaft is partially rotated or oscillated by a train of gearing in the following manner: The pinion 62 on the upper end of the right hand solid shaft 40$^A$ meshes with one end of a rack bar 89, the opposite end of which meshes with a pinion 90 that is secured on the end of a shaft 91, the opposite end of which is provided with a bevel gear 92 that meshes with the bevel gear 88 on the adjacent end of the shaft 85. Thus the movement of the right hand cam 48$^A$ is imparted to the shaft 40$^A$ in the same manner described in connection with the left hand cam 48, and the shaft 40, the mechanisms operating these two shafts being duplicates of each other, and located on opposite sides of the machine.

After the head blocks B and C have dropped down at a short distance behind the box, the head block B is moved forward by the pinion 28 and rack bar 31 and as its push block 3 advances to the box, the upwardly beveled bottom surface of a block 93 carried by the plate 72 of the said head block B engages the up-standing edge of the blank and bends it inwardly over the top edge of the box to the same angle as the bottom of the finger. Then the box is engaged by the push block 3 and is moved forward against the abutment block 4 of the head block C and as the box moves toward that abutment block the rear end of the box and the up-standing edge of the blank are pushed against the beveled bottom surface of a block 94 carried by the plate 72 of the head block C, and as the rear end of the box advances under this block 94 the up-standing edge of the blank is bent into the box down to the edge of the box, which is engaged by the base edges of both blocks 93 and 94 when the box is finally gripped between the push blocks of both heads. The blocks 93 and 94 are then both raised upward vertically about a half of an inch by the movement of their links 82 and lever 84 and the square rod 85 and by the same means are then moved straight down until the heels of these blocks rest directly on top of the end edges of the box, when pressure enough is applied to them through the links to firmly seat the box against the top of the table, and both finger blocks are then raised and remain up while the side turn in mechanisms advance and turn over and in and against the inside surfaces of the box the upwardly projecting side edges of the blank.

These mechanisms that turn in the opposite side edges of the blank into the box are constructed, arranged and operate as follows:

To the top of the table on opposite sides of its longitudinal center and at equal distance from it, we secure two head blocks 95, which support the side turn in mechanisms. The side turn in mechanisms of these two head blocks face each other and as they are exactly alike a description of one will suffice for both.

Each head block consists of a base portion 96 that is slidably mounted to be moved in a horizontal plane in a transverse slideway 97 formed in the table, and a vertically movable chuck block 98 that is vertically adjustable upon upwardly projecting standards 99 that are formed on the base 96. The standards are yoke shaped and are provided with guideways and each chuck block is provided with a capped lug portion 100 that is slidably mounted in the guideway of the standard. A threaded rod 101 is rotatably mounted at its upper end in a bushing 102 at the top of the standard and threads down through the lug 100 of the chuck block, its lower end resting in a bearing 103 in the adjacent end of the base 96. The threaded rod is adapted to receive a wrench to turn it to raise or lower the chuck block which has a vertical movement on the standard sufficient to allow it to be adjusted to all heights or depths of boxes the machine will wrap. This chuck block extends down through a slot in the table, when adjusted for boxes of slight depth, and it is adjustably movable up and down to accommodate boxes of different depths, and is fixed in adjusted positions by its cap 104 which can be clamped tightly to the standards. The chucks face the opposite sides of the box that is to be wrapped and the opposing side members of each chuck are each provided with a semi-circular slideway 105, and in each pair of slideways is mounted a segmental block 106, which therefore travels in a semi-circular path and is moved in this path by a combination of link and lever members, which are constructed and act as follows:

The segment block is of the form shown in Figs. 2 and 3, and is provided with a depending lug 107, to which one end of a link 108 is pivoted. The lower end of this link is provided with an oblong slot and is pivotally connected through this slot by a pin 109 to the upper end of a vertically reciprocable bar 110, which is slidably mounted in a guide 111 that is formed on a depending portion of the head block.

The lower portion of each of the bars 110 is provided with an adjustable collar 112 that rests on a spring 113 that is housed to a socket 114 that is attached to a cross bar 115, which cross bar is given a vertical reciprocating movement by a forked lever 116, to which it is bolted, and which is operated by a cam 117, which is secured upon the main driving shaft 52. The upper end of the forked lever moves in a guideway of a standard 118, which is bolted to the bed plate. The upper portions of the bars 110 are square, but the lower portions thereof are rounded and extend through the springs 113 and sockets 114 to allow for vertical adjustments to correspond with adjustments of the head blocks to fit boxes of different heights.

Each bar 110 has a rib portion 119 that has a cam curve 120 at its upper end, that engages a roller 121 that is mounted on the depending member 122 of a rock arm. This rock arm comprises a long hub that is pivotally mounted on a pin 123 that extends through it and the sides of the chuck, the depending member 122 and two arms 124 spaced a short distance apart and extending upward, the end of each of which terminates in a fork 125 in which lie rollers 126 which are mounted on opposite sides of a hub portion on one end of a sliding block 127, which is reciprocally mounted in a slideway formed in the top of the segment block 106. Arms 128 project from the opposite ends of the hub, the outer ends of which are connected to the lower ends of springs 129 that act to normally hold the rollers 121 in contact with the ribs 119 of the bars 110. The opposite ends of the springs are connected to pins 130 that are secured to the sides of the chuck. This sliding block is provided with a cap 131 that is arranged to clamp a side turn in blade 132, as shown by Figs. 2 and 3. The side turn in blades are of a length corresponding to the inside length of the boxes being covered.

Along the front face of each chuck we secure a bar 133, against which the upper edges of the sides of the boxes bear, when the turn in blades bend the extended portions of the sides of the blank over against the inner faces of the sides of the box, as shown by the dotted lines in Fig. 2.

These two chuck heads and their bases are arranged to be moved in unison together toward or away from the longitudinal center of the machine in the following manner:

Each head block is formed with an opening in which is secured an internally threaded bushing 134, in which is screwed a plug 135, having a square hole, the outer end of the plug having an annular groove 136. Through these plugs passes a square rod 137, the ends of which are rounded and enter bushings in the sides of the table. A threaded rod 138 extends parallel with and adjacent to the square rod 137, and upon the end portions of the threaded rod are screwed followers 139, comprising hub members having arms, the outer ends of which are bifurcated, and straddle the annularly grooved ends of the plugs 135. Thus by turning the crank handle 140 on the end of the threaded rod 138, the said rod is rotated, and the head blocks are moved inward or outward, in their slideways.

The object of threading the plugs 135 to the bushings 134 is as follows: When the boxes pass from the first into the second stage position, the head blocks stand in such positions relatively to each other that the boxes may pass readily between the bars 133 without touching them, but after they have reached their proper position, it is necessary that their sides should be engaged by the said bars 133, and to accomplish this a slight inward movement is given to each head block, by turning the square rod by which the plugs 135 are turned, and as the plugs when turned by the square rod are held against lateral movement by the followers 139, the head blocks are thereby moved in or out according to the direction of rotation of the plugs. The square rod is turned in the following manner: A cam disk 141 on the main shaft 52 has a cam which engages a roller on one member 142 of a double crank arm, which is supported in a bracket 143 that is bolted to the bed plate of the machine. The other arm 144 connects with the lower end of a connecting rod 145, the upper end of which is pivotally attached to a lever 146, which is mounted on the adjacent end of the square shaft. It will thus be seen that the cam 141 imparts movement to the connecting rod 145, by which the lever 146 is rocked and the shaft turned.

The chucks having been adjusted with their guide strips in operative relation to receive a box and blank between them, the segment block and the sliding block operate to cause the side turn in blade 132 to turn in the upwardly projecting side edges of the blank into the interior and against the inside surfaces of the box in the following manner:

When the bars 110 are raised by the cam 117 the cam curve 120 at the upper end of the bars first engages the rollers 121 of the rock arm, which causes the lower ends of the rock arms to swing out and their upper end to push the sliding blocks 127 forward toward the box, which causes the side turn in blades to move horizontally forward and engage the projecting edges of the blank, and in moving forward they barely clear the top side edges of the box; then as they reach the end of their inward stroke the pins 109 at the tops of the bars 110 have by this time moved up with the bars to the upper end of the slots in the links 108, which connect the bars with the segment blocks 106 and thus lift the segment blocks, causing them to move in an arc of a quarter of a circle in the semi-circular curved slideways of the chucks, which causes the sliding blocks and the turn in blades to tilt upward into vertical positions, and as the blades tilt over the side edges of the box they bend the edges of the blank over into the box and against its inside surfaces and the blades press the blank tightly against the inside surfaces of the box when it swings into a full and a trifle more than a full vertical position, which brings a decided side pressure of the blades 132 against the inside of the box, thus firmly pressing the edge of the blank against the inside surface of the box, the turning in blades thus rolling over the edge of the box and pressing flat against its inside surface, the sides of the box with the turned in blank being pressed between the said blades and the bars 133.

When the segment blocks move upward in their curved slideways 105 in the chucks, they lift the rollers 126 of the sliding block 127 out of the yoke ends 125 of the arm and swing them up into such a vertical position as is necessary to cause the finger blade to press the edge of the blank against the inside surface of the box.

When the side turn in blades 132 have been moved against the inside of the box with the full pressure of their links 108, their cam and rod and link operating mechanism hold them there long enough to allow the blank edge turning in end fingers to complete their blank turning in action. This they now do by the rotary action of the worms 63, which now act through their cam and lever and gearing actuating mechanism to move the toothed segments 64, which consequently rock the levers 66 to engage the pins 67, by which the plates 72 with their end turn in blocks 93 and 94 are swung outward or toward each other, and instantly thereafter, the rod 85 is partially rotated, in the manner previously described, and the members 70 with the plates 72 are depressed through the medium of the links 82, and levers 84, and the blocks 93 and 94 pass down into the box, the ends of which pass between the said blocks, and the abutment blocks 3 and 4 respectively, whereby the ends of the blanks are folded down against the inside surfaces of the ends of the box.

Consequently the end turn in blocks on this their second downward movement complete the end turning in operation of the edges of the blank.

These end turn in blocks are so formed that they fit down into the box between the side turn in blades and press the corners of the blanks down smoothly into the corners of the box. The end blocks then first move up out of the box and then the side blades are swung to a horizontal position by the downward movement of the bars 110, and the links 108, and the rollers 126 of the sliding block 127 are swung down into the forks of the rock arm, and when the curved cams of the bars pass below the said rollers 121, the contraction springs 129 swing the rock arms backward, which movement draws the sliding block and the side turn in blades back out of the path of the box, which is now wrapped as far as the action of the turn in mechanism of this machine will wrap it, and it is now ready to be transferred to the end finishing mechanism. A stop pin 147 extends through the rear end of the plate 127, and into a recess 148 in the rear end of the segmental block, and prevents dropping of the plate in its slideway in the block, when the block has been moved to the position shown in dotted lines, Fig. 2, in which the plate 127 stands vertical. The blades 132 however are not withdrawn from contact with the edges of the sides of the box, until after the box has been engaged by grippers 149, as will be explained.

The ends and sides of the top edges of the blank have now been completely wrapped and glued against the interior surfaces of the box, and are completed, and the head blocks have been raised up above the box by the upward vertical movement of the overhead arm 5. Then the box gripping and transferring arms 149 and their operating mechanism act by being moved rapidly from the third treatment station back to the second treatment station, where the grippers grip the now almost completed box and transfer it to the third or finishing station, in a manner and by mechanism to be hereinafter described.

The finishing treatment of the now wrapped box consists of administering a finishing pinching pressure against the opposite ends and in the end corners of the box, and the mechanism which accomplishes this is adjustably mounted on the overhead arm 5 which has a vertical reciprocal movement that is timed to act to move the box end clamping mechanism down behind the front end of the box after it has been moved into the finishing station by the box transmission mechanism, which downward stroke of the overhead arm is the same stroke that moves the head blocks of the second or turn in station down behind the ends of the box. The box treatment mechanisms of both these mechanisms are timed to act in unison, as relates to the reciprocal movement of the overhead arm.

The mechanism that applies the clamping pressure to the ends of the box in the finishing station comprises two head blocks E and F, each of which is slidably mounted on a slideway portion 150 formed on the under side of the overhead arm, each head block being provided with guideways 151 that are provided with caps 152. These two head blocks are adjustably mounted at box receiving distances apart on opposite sides of the vertical center of the station to fit boxes of different lengths, by a right and left handed threaded rod 153 which extends through a threaded aperture in each head block. At the center of the length of this threaded rod it is supported by a split journal box 154, which is provided with a clamping sleeve through which the rod rotatably passes, and a thumb nut 155 is arranged to close the sleeve to grip the screw, a collar being pinned to the rod on each side of the sleeve to prevent endwise movement of the rod. This screw is also supported at its rear end by a lug 156 which is secured to the adjacent end of the arm 5 and the end of the screw is arranged to receive a crank lever 157, by which the operator may turn it to move the head blocks in positions to fit boxes of different lengths. Each of these head blocks has a hollow chamber opening up into it from its lower edge, and the box edge clamping mechanism is positioned in and depends from this opened chambered end. The mechanism for each head block is of the construction and arrangement following, and it consists of an eccentric 158 formed on a shaft 159, which extends transversely across the block and is mounted in bearings formed in its opposite sides. The shaft 159 is rotated by a bevel gear 160 that is secured on one end of it, and which meshes with a bevel gear 161 having a hub which is mounted in a bearing on one side of the head block, the gear 161 having a square aperture through which passes a square shaft 162. This square shaft extends past both heads, and it is provided at its inner end with a bevel gear 163 that meshes with a bevel gear 164 that is secured on the lower end of a vertical shaft 165 that extends up through bearings 166 formed on a bracket 167 secured to the overhead arm 5. A spur gear 168 is secured on the upper end of the shaft 165, which meshes with the gear 61 that is mounted on the upper end of the right hand square tubular shaft 39<sup>A</sup>, which extends down through one of the large tubular standards 10, the lower end of which carries the gear 41<sup>A</sup> which meshes with one of the straight rack bars 43<sup>A</sup>, as previously described.

Two arms 169 are rotatably mounted on the eccentric of the shaft and their ends are pivotally secured to lugs 170 that are formed on a plate 171 that is provided with guideways and is slidably mounted in slideways formed in the opposite sides of the head block. An abutment bar 172 which preferably consists of a piece of wood, is clamped to the outer end of the plate by a clamping cap 173. The abutment bar is arranged to fit snugly down inside of each box between its sides at its ends, and it has a short reciprocal movement against the inside surface of the adjacent end of the box due to the throw of the eccentric, which acts to press the bar against the inside surfaces of the wrapped ends of the blank that were glued to the box at the second station, but which need a pinching pressure to smoothly flatten them against the inside ends and corners of the box.

Upon the eccentric shaft at the side of the arms two short levers 174 are mounted, the free ends of which are pivotally secured to the opposite sides of one end of a link 175. The opposite end of this link is secured to one of the ends of two pairs of links 176 and 177. One end of the links 176 is pivotally secured to a block 178 which is secured to a cross bar 179, which is bolted to the sides of the head block. The opposite ends of the other two links 177 are pivotally secured to lugs which are formed on a plate 180, that is bolted to a pressure bar 181, the front end of which is covered with a strip of felt. The pressure bar 181 and the felt strip are made wide enough to extend across the outside end of the greatest width boxes covered by the machine. This pressure bar has guideway side edges which fit in slideways 182 formed in the insides of the side pieces of the pressure plate 171. The toggle links 176 and 177 due to the partial rotative throw movement of the eccentric shaft impart a short reciprocal movement to the outside pressure bar 181, which is arranged and timed to move against the outside surface of the end of the box, and to oppose the pressure movement of the inside abutment bar 172 against the inside of the box. Both movements take place at the same time and pinch or clamp the ends of the box between them. The block 172 acts as an abutment for the toggle power pressure of the arms 177. When a box arrives at its proper stopping position of the finishing treatment station, the overhead arm is at the top of its upward stroke and consequently the head blocks are raised above the path of the incoming box. Both head blocks are positioned and timed so that when a box is transferred from the turn-in station to the finishing station the presser bars will stand directly over the ends of the box, and these presser bars are spaced as far apart as the eccentric shaft will throw them, which would be preferably about a quarter of an inch.

Then when the overhead arm moves down, these bars straddle the opposite ends of the boxes at their upper edge portion. Then the cam and gearing mechanism that operates the eccentric shaft of the head blocks acts to cause the eccentric through the arms 169 to move the blocks 172 against the inside surface of the ends of the box, and through the toggles 176 and 177, link 175 and levers 174, to move the presser bar 181 against the outside surface of the box, and thus very tightly pinches the end edges and corners of the box between them.

The box has now been completely wrapped and its corners finished and it is ready to be released and discharged from the machine.

The presser bars then move apart to release the box by the action of the eccentric shaft. The overhead arm then raises the head blocks above the box, and it is engaged by a push arm 182 and is moved off from the discharge end of the wrapping machine.

The mechanism that engages the box and discharges it from the finishing station and from the machine is a part of the same mechanism that moves the box from the turn in to the finishing station, and this box transferring and discharging mechanism will now be described.

The stop member 2 comprises an arm that is pivotally mounted on a pin 183 which passes through to a support or carriage 184 which is mounted on a slideway 185 that extends longitudinally of the length of the machine to its discharge end, commencing adjacent to the turn in mechanism and extending under the finishing mechanism but below the level of the top of the table to which it is secured at its ends and at intermediate points. This slideway 185 is provided along its opposite sides with projecting slide rails 186 and the carriage is arranged to straddle the under side of the slideway 185 and fit slidably on and over the rails 186, the said rails being of a length to permit the carriage to be adjusted to bring the stop arm 2 in position to engage boxes of different lengths.

The carriage 184 as illustrated is positioned below the side and turn in mechanism, the stop arm 2 being in a position to stop the largest size boxes the machine will wrap.

The side and end turn in mechanisms are also set to receive the largest size boxes the machine will wrap. In order to move the carriage 184 and its stop arm to stop smaller sized boxes down to the smallest size the machine will wrap, we provide a hand operating threaded rod 187 which is rotatably threaded to the carriage, while its outer end is rotatively mounted in a bearing 188 formed on the cross rib 189 of the adjacent end of the table. A hand grasping knob 190 is mounted on the outer end of the rod, which is so arranged in its bearing that when it is turned by hand the bracket and arm are moved along the rails 186 of the slideway 185, to the required point relatively to the length of boxes being covered.

The longitudinal center of the turn in station of the machine is defined by a vertical arrow (Fig. 1) and all adjustments of the box wrapping and transferring mechanisms for different sizes of boxes at this turn in station are made relative to this point as the center of the length of the box being wrapped at this station or mechanism.

A slot 191 of suitable length is formed in the bottom of the slideway 185. A spur gear 192 is loosely mounted on a cross shaft 193 that extends across and is secured in bearings in the sides of the table. The spur gear projects up into the slot 191 and meshes with a toothed rack bar 194 which we term the box shifter rack, and which is mounted in the slideway 185. The gear wheel 192 has a pinion gear 195 rigidly secured thereto in any suitable manner, and this pinion meshes with a toothed bar 196, the lower end of which is bolted to a forked lever 197, which straddles the main shaft 52, and is provided with a roller which enters a suitable cam groove in the cam disk 60, which is mounted on the main shaft. The upper end of the toothed bar 196 passes through a guideway 198, which is rigidly secured to the shaft 193. This box shifting rack bar is provided with a centrally projecting flange 199 which extends throughout its full length. This box shifting rack is held in the slideway by caps 200 which are screwed to the top edges of the slideway. To the flange above these caps two clips 201 are secured, which project above the flange and form bearings for the opposite ends of a right and left hand threaded rod 202. Upon the opposite ends of the threaded rod 202, blocks 203 are threaded, the upper ends of which are bifurcated to receive the lower ends of the gripping arms 149, which are rigidly mounted upon pins 204, which are pivotally mounted in the bifurcated ends of the said blocks, their ends extending beyond the sides of the blocks. Upon one end of each of the pins 204, is rigidly mounted an arm 205, the arms extending in opposite directions, and upon the outer end of each arm is mounted a roller 206. Upon the opposite end of each pin is secured a nut or washer 207, and a coil spring 208 is mounted on the pin between the nut and the block 203, one end of which enters a hole in the block, these springs being under tension which is exerted to raise the arms so that their outer ends, which are upturned, will extend a slight distance above the plane of the table. The lower ends of the blocks 203 are also bifurcated, and are slidably mounted on the flange 199 of the rack bar 194.

The box gripping arms 149 have their upper ends arranged to stand vertically upright when at the limit of their upward movement, and these upper ends are adapted to move against and grip the opposite ends of each box at the turn in station, with sufficient pressure to hold it and move it to the finishing station, as will be hereinafter described.

The outer end of the threaded rod 202 is provided with a transversely positioned pin which with the terminal end of the rod is adapted to receive a hand operated socket wrench by means of which the threaded rod may be turned and the blocks 203 moved toward or away from each other to grip any size box from the smallest to the largest; as illustrated they are shown arranged to grip the largest size box the machine will wrap. These box grippers are moved down out of the way of each box after they deliver it to the finishing station, by a longitudinal bar 209, the upper edge of which terminates in a horizontal lip 210, which at all times engages the rollers 206 on the arms 205. The opposite ends of the bar 209, are pivotally attached to levers 211 and 212 respectively, the opposite end of the lever 212 being loosely mounted on the threaded rod 138, which extends transversely across the table and is mounted in bearings in opposite sides of the frame. One end of this rod is provided with a crank handle 140. by which the rod may be turned to effect the adjustment of the side turn in mechanisms, as previously described. The lever 211 is mounted midway of its length upon a stationary shaft 213 which extends transversely across the table and is supported in the sides thereof.

The opposite end of this lever 211 is pivotally attached to one end of a connecting rod 214, the opposite end of which is pivotally connected to a lever 215 which is mounted midway of its length upon the stationary shaft 58, also supported in the side frames of the machine. The opposite end of the lever 215 carries a roller 217 which is engaged by a cam 218 on the circumferential edge of a disk 219, which is rigidly mounted on the shaft 49, which is supported in bearings in the side frames of the machine. The roller is held against the edge of the cam disk 219 by a coil spring 220 which surrounds the shaft 58, and is attached at one end to the lever 215 and at the other end to a collar on the said shaft. The shaft 49 carries a bevel gear wheel 50, which meshes with a similar gear 51 on the adjacent end of the main shaft 52.

As the disk 219 rotates, the cam 218 engages the roller 217, thereby rocking the lever 215, by which the rod 214 is drawn upon and the lever 211 rocked, its upper end being raised together with the upper end of the lever 212, which moves in unison with the lever 211, through its connection with the bar 209. This movement of the levers 211 and 212 raises the said bar 209, the lip 210 of which engages the rollers 206 and the arms 205, which, with the grippers, are permitted to rise to the position shown in Fig. 1, the cam 218 being timed to effect the raising of the bar 209, to allow the grippers 149 to engage each box after the turn-in treatment has been accomplished, and to advance the box to its finishing treatment.

The rear end of the rack bar 194 has secured thereto an upright 221, which is similar to the blocks 203, and this upright supports the box discharging arm 182, rigidly mounted on a pin which passes through the upright and carries at one end an arm 222, similar to the arms 205, and which is also provided with a roller similar to the rollers 206 on the arms 205. The arm 182 is also actuated in one direction by a spring similar in all respects to the springs 208, which raise the arms 205. The roller carried by the arm 222 is in continuous engagement with the lip of the bar 209, and the discharging arm 182 is, therefore, actuated simultaneously with the gripper arms 149 to discharge the finished box from the machine.

It will thus be seen that at each rearward movement of the rack bar a box is transferred from the turn-in position to the finishing position by the grippers 149 and the box which was in the finishing position is caught by the arm 182 and discharged from the machine.

At the time the box is engaged by the front end turn-in mechanism and its forward movement of about an inch against the rear abutment block 4 has commenced, the stop arm 2 is swung down away from the box by its operating mechanism which is constructed and arranged as follows:

The carriage 184 is provided with a depending portion, in which a vertically arranged rack bar 223 is mounted. The gear teeth of this rack bar engage a pinion 224 that is mounted on the supporting pin 183 of the stop arm. The lower end of this rack bar is provided with a shoulder 225 which is adapted to be engaged by a longitudinal lip 226 on a horizontally positioned bar 227 which is secured to the upper end of a bar 228, the lower end of which is secured to a reciprocating cam fork 229, the lower end of which straddles the main driving shaft 52, and is provided with a roller which engages the cam 141 that is secured on the main driving shaft. The cam 141 is timed to draw the bar 228 and consequently the bar 227 down, at the instant the rack bar moves forward to bring the grippers 149 to the turn-in position, and as the lip of the bar 227 engages the shoulder 225 on the rack bar 223 and depresses the said rack bar, its engagement with the gear wheel 224 causes the same to turn the shaft 183 upon which the stop arm 2 is rigidly mounted, and the said stop arm is turned down to the position shown in full lines in Fig. 1. The upper end of the rack bar 223 terminates in a horizontal arm 230 which is engaged by a longitudinal flange of the rack bar 194, as the said rack bar moves forward and the stop arm is thus held down until it is released by the rack bar on its rearward movement. The stop arm 2 is thrown up by a coil spring 231 which surrounds a projecting end of the pin or shaft 183, upon which the stop arm is rigidly mounted. One end of this spring enters a hole in the adjacent side of the carriage, while the other end thereof enters a hole in a collar 232 which is secured upon the adjacent end of the pin 183, the tension of the spring causing the stop arm to swing to a vertical position, when it is in position to stop a box. After drawing the rack bar down, as previously described, the cam 141 raises the bar 227 to the limit of its upward movement, as shown in Fig. 16, when its lip 226 is ready to again engage the shoulder 225 on the lower end of the rack bar 223, when the same is released by the rack bar 194 and thrown upward by the spring actuated gear wheel 224.

The box is now in its turn-in treatment position and it is engaged and operated on as above described.

Our invention provides an end turn-in and finishing machine for partially wrapped boxes, that will complete from about thirty-five to fifty boxes per minute; and while we have illustrated the preferred construction and arrangement of our invention we do not wish to be limited to it, as many changes might be made without departing from the spirit of our invention.

Having described our invention, what we claim as new and desire to secure by Letters Patent, is:

1. In a combined box edge wrapping and finishing machine, the combination of heads having end-turn-in wipers, chucks having side-turn-in wipers, with end finishing heads having clamping mechanisms, and means for transferring boxes from the side and end-turn-in position to the finishing position, and from the finishing position away from the machine simultaneously.

2. In a combined box edge wrapping and finishing machine, the combination of vertically movable and horizontally adjustable heads having end-turn-in wipers, horizontally adjustable chucks having vertically adjustable side-turn-in-wipers, with vertically movable and horizontally adjustable end finishing heads having clamping mechanisms, and means for simultaneously transferring boxes from the side and end-turn-in position to the finishing position and from the finishing position away from the machine.

3. In a combined box edge wrapping and finishing machine, the combination of heads having end-turn-in wipers, chucks having side-turn-in wipers, end finishing heads having clamping mechanisms, and means for simultaneously transferring boxes from the side and end turn-in position to the finishing position, and from the finishing position away from the machine, of means including an over-head vertically reciprocating arm for moving said end-turn-in heads and said finishing head and their operating mechanism into and out of operative relation to the boxes.

4. In a combined box edge wrapping and finishing machine the combination of the table frame provided with a power driven shaft, a box wiper supporting arm above said table, means including tubular uprights for reciprocally supporting said arm, a cam on said power driven shaft, and means including mechanism operated by said cam and said power driven shaft for vertically reciprocating said arm.

5. In a combined box edge wrapping and finishing machine, the combination of the table frame provided with a power driven shaft, a box wiper supporting arm above said table, means including tubular uprights for reciprocally supporting said arm, a cam on said power driven shaft, means including mechanism operated by said cam and said power driven shaft for vertically reciprocating said arm, and means including a worm gear mechanism for vertically adjusting said arm for boxes of different heights.

6. In a combined box edge wrapping and finishing machine, the combination with end and side-turn-in, and finishing treatment mechanisms, of reciprocating means for simultaneously transferring boxes from the side and end turn-in mechanisms to the finishing mechanism, and from the finishing mechanism to a point where they are discharged from the machine.

7. In a combined box edge wrapping and finishing machine, the combination with side and end-turn-in mechanism, at one position and finishing treatment mechanism at another position, of means for simultaneously transferring boxes from the first to the second position and from the second position to a point of discharge from the machine, said means comprising reciprocating box engaging mechanism, and means for stopping boxes delivered to the first position.

8. In a combined box edge wrapping and finishing machine, the combination with a frame having a table, and oppositely arranged side-turn-in mechanisms adjustably mounted in said table, of vertical standards slidably mounted in said table, an overhead arm supported on said standards, end-turn-in mechanism adjustably mounted on one end portion of said arm in position to cooperate with the side-turn-in mechanisms, clamping mechanisms for giving an end finishing treatment, which are adjustably mounted on the other end portion of said arm, a cross head connecting the lower end of said standards, a power driven shaft in said frame, a cam on said shaft, a member operated by said cam and adjustably connected to said cross head, whereby the overhead arm is given a reciprocating movement, and means for effecting an adjustment between the said member and cross head.

9. In a combined box edge wrapping and finishing machine, the combination with a frame and side-turn-in mechanisms mounted thereon, of standards slidably mounted in said frame and connected at their lower ends by a cross head, an overhead arm mounted on said standards, end-turn-in and end pinching mechanisms mounted on said overhead arm, a power driven shaft mounted in said frame, a cam on said shaft, and means adjustably connected to said cross head and operated by said cam for raising and lowering said overhead arm.

10. In a combined box edge wrapping and finishing machine, the combination with a frame, side-turn-in mechanisms mounted thereon, and a power driven shaft mounted in said frame, of tubular standards slidably mounted in said frame, a cross head connecting said standards, an overhead arm carried by said standards, a cam on said shaft and mechanism operated thereby for reciprocating said standards and overhead arm, end turn-in and end finishing mechanisms mounted on said overhead arm, tubular shafts within said tubular standards, solid shafts within said tubular shafts, means operated by the power shaft for operating said solid and hollow shafts, and means operated by said hollow and solid shafts for operating said end-turn-in and said finishing mechanisms.

11. In a combined box edge wrapping and finishing machine, the combination with the table frame provided with a power driven shaft and with slideway bearings, of side turn-in mechanisms adjustably mounted in said bearings, an overhead arm, standards that support the same, a cross head secured to the lower ends of said standard, a vertically arranged threaded rod secured in said cross head, a cam fork secured to the lower end of said threaded rod, a cam on said shaft in engagement with said cam fork, whereby said overhead arm is vertically reciprocated, and end turn-in and end pinching heads carried by said arm.

12. In a combined box edge wrapping and finishing machine, the combination with the table frame provided with a power driven shaft and with slideway bearings, of side-turn-in mechanisms adjustably mounted in said bearings, the overhead arm, and end turn-in and end finishing heads adjustably mounted on said arm, the standards that support said arm, the cross head secured to the lower ends of said standard, a vertically arranged threaded rod secured in said cross head, a cam fork secured to the lower end of said threaded rod, a cam on said shaft in engagement with said cam fork, whereby said overhead arm is vertically reciprocated, said crosshead being provided with a recess, a worm gear mounted on said threaded rod in said recess, a worm pinion in mesh with said worm gear, a shaft extending through said worm pinion and through the side of said frame, and a hand wheel mounted on the outer end of said pinion shaft, whereby said overhead arm may be raised or lowered relative to said table independent of its vertical reciprocal movement.

13. In a combined box edge wrapping and finishing machine, the combination with a frame having a table portion, of an overhead arm mounted in said frame and means for raising and lowering the same, end-turn-in heads having turn-in mechanism adjustably mounted on one end portion of the arm, finishing heads having clamping mechanism mounted on the other end portion of the arm, side-turn-in mechanism comprising base blocks adjustably mounted in said table, and means vertically adjustable in said base blocks carrying turn-in members, said blocks facing each other and being spaced to correspond to the width of a box, and being positioned to act in concert with the end turn-in mechanisms, and means for operating said mechanisms in predetermined order.

14. In a combined box edge wrapping and finishing machine, the combination of a table frame, an overhead arm and its reciprocating mechanisms, end turn-in heads and their mechanism, and finishing heads having clamping mechanisms, side-turn-in mechanisms mounted on said table and comprising horizontally adjustable bases having vertically adjustable turn-in members which face each other and are spaced to correspond with the width of a box, and positioned to act in concert with the end turn-in mechanisms, means for operating said mechanisms in predetermined order, and reciprocating means for transferring boxes from the side and end turn-in position to the finishing position, and simultaneously from the finishing position to a point of discharge from the machine.

15. In a combined box edge wrapping and finishing machine, the combination with a table frame provided with transverse slideways, oppositely positioned side-turn-in mechanisms mounted in said slideways, and means for adjusting said mechanisms toward and away from each other simultaneously, of a cam operated, vertically movable overhead arm mounted in said frame, end turn-in and finishing mechanisms adjustably mounted on said arm, means for operating said mechanisms in predetermined order, and means for transferring boxes from the side and end turn-in position to the finishing position, and from the finishing position, simultaneously.

16. In a combined box edge wrapping and finishing machine, the combination of the table frame, the adjustable overhead arm, the turn-in and finishing heads adjustably mounted on the same, and means including a cam controlled lever operated mechanism for intermittently reciprocating said arm.

17. In a combined box edge wrapping and finishing machine, the combination of the table frame with an arm reciprocally mounted over said table frame, tubes extending from said table to said arm, a cross head adjustably connected to said tubes, means including a power driven shaft, a cam and lever mechanism for intermittently reciprocating said arm, and blank edge turn-in and finishing heads adjustably and operatively mounted on said arm.

18. In a combined box edge wrapping and finishing machine, the combination with a table frame and side turn-in mechanisms thereon, of an adjustable vertically reciprocating overhead arm and its operating mechanism mounted in said frame, end turn-in mechanism depending from said arm in position to act in concert with the side turn-in mechanisms, finishing mechanisms depending from said arm and means for operating said mechanisms in predetermined order.

19. In a combined box edge wrapping and finishing machine, the combination with a frame, and adjustable side turn-in mechanisms thereon, of tubular standards slidably mounted in the frame, an arm supported on said standards having end turn-in and end finishing mechanisms, a cross head connecting said standards, and cam operated means connected with the cross head for raising and lowering the arm, spaced pinions mounted on said frame in axial line with said tubular standards having square apertures, square hollow shafts extending through said tubular standards and slidably through the uppermost pinions, solid square shafts extending through the hollow shafts and slidably through the lowermost pinions, cam operated rack bars for rotating said pinions, gears on the upper ends of said shafts, and gearing operated by the gear on the ends of said shafts for actuating the end turn-in and finishing mechanisms.

20. The combination with a frame and coacting side-turn-in devices mounted thereon, of a vertically movable arm supported on said frame, end turn-in devices mounted thereon in position to act alternately with the side turn-in devices, end clamping devices on the opposite portion of said arm, and reciprocating means for transferring boxes from the side and end turn-in position to the end clamping position and from the latter position to a discharging point simultaneously.

In testimony whereof we affix our signatures in presence of two witnesses.

MELVILLE E. PETERS.
GEORGE H. FATH.
ALBERT F. MILLER.

Witnesses:
G. SARGENT ELLIOTT,
ADELLA M. FOWLE.